(12) United States Patent
Bing et al.

(10) Patent No.: US 10,174,710 B2
(45) Date of Patent: Jan. 8, 2019

(54) METHOD FOR PRODUCING A PISTON FOR AN INTERNAL COMBUSTION ENGINE AND PISTON PRODUCED BY MEANS OF SAID METHOD

(71) Applicant: Mahle International GmbH, Stuttgart (DE)

(72) Inventors: Karlheinz Bing, Remseck (DE); Daniel Mock, Ditzingen (DE); Mathias Petrowitsch, Gerlingen (DE)

(73) Assignee: Mahle International GmbH (DE)

( * ) Notice: Subject to any disclaimer, the term of this patent is extended or adjusted under 35 U.S.C. 154(b) by 217 days.

(21) Appl. No.: 15/311,514

(22) PCT Filed: May 13, 2015

(86) PCT No.: PCT/EP2015/000980
§ 371 (c)(1),
(2) Date: Nov. 15, 2016

(87) PCT Pub. No.: WO2015/172880
PCT Pub. Date: Nov. 19, 2015

(65) Prior Publication Data
US 2017/0107934 A1   Apr. 20, 2017

(30) Foreign Application Priority Data
May 16, 2014   (DE) .......................... 10 2014 007 127

(51) Int. Cl.
*F02F 3/00* (2006.01)
*B23K 26/28* (2014.01)
(Continued)

(52) U.S. Cl.
CPC .............. *F02F 3/003* (2013.01); *B23K 26/24* (2013.01); *B23K 26/28* (2013.01);
(Continued)

(58) Field of Classification Search
CPC ......... F02F 3/003; B23K 26/24; B23K 26/28; B23K 35/0255
See application file for complete search history.

(56) References Cited

U.S. PATENT DOCUMENTS 5,211,327 A * 5/1993 Clarke .................. B23K 10/02
219/121.14
2009/0020007 A1  1/2009 Lin et al.
(Continued)

FOREIGN PATENT DOCUMENTS

DE   19947314 A1   4/2001
DE   10229744 A1   1/2004
(Continued)

OTHER PUBLICATIONS

English abstract for DE-10229744.
(Continued)

*Primary Examiner* — Kevin A Lathers
(74) *Attorney, Agent, or Firm* — Fishman Stewart PLLC

(57) ABSTRACT

A method for producing a piston may include aligning at least two piston components along corresponding joining surfaces, activating a laser designed for deep-welding, and aligning a laser beam with a starting point. The method may then include increasing a power density of the laser beam over a first defined path along the joining surfaces to produce a weld seam with an increasing weld seam depth, deep welding along the joining surfaces to produce a deep weld seam with a substantially constant weld seam depth up to a defined end point, and reducing the power density over a second defined path to produce a weld seam with a decreasing weld seam depth. The method may further include overwelding at least part of at least one of the first and second defined paths by a laser designed for heat conduction welding to produce at least one heat conduction weld seam.

20 Claims, 4 Drawing Sheets

(51) Int. Cl.
  *B23K 35/02* (2006.01)
  *F02F 3/20* (2006.01)
  *B23K 26/24* (2014.01)
  *B23P 15/10* (2006.01)

(52) U.S. Cl.
  CPC .......... *B23K 35/0255* (2013.01); *B23P 15/10* (2013.01); *F02F 3/20* (2013.01); *F02F 2003/0061* (2013.01)

(56) References Cited

U.S. PATENT DOCUMENTS

| | | |
|---|---|---|
| 2012/0211474 A1 | 8/2012 | Hayashimoto et al. |
| 2013/0014723 A1 | 1/2013 | Bucher |
| 2013/0068096 A1* | 3/2013 | Gabriel .................. B23P 15/10 92/231 |

FOREIGN PATENT DOCUMENTS

| | | |
|---|---|---|
| DE | 102012003720 A1 | 8/2012 |
| DE | 102011107659 A1 | 1/2013 |
| EP | 1057577 A2 | 12/2000 |
| EP | 1818129 A1 | 8/2007 |
| JP | 2003-71579 A | 3/2003 |
| WO | WO-2004004958 A2 | 1/2004 |
| WO | 2013044015 A1 | 3/2013 |

OTHER PUBLICATIONS

English abstract for DE-19947314.
English abstract for EP-1057577.
German search report for DE-102014007127.8, dated Feb. 3, 2015.
English abstract for JP-2003071579.

* cited by examiner

METHOD FOR PRODUCING A PISTON FOR AN INTERNAL COMBUSTION ENGINE AND PISTON PRODUCED BY MEANS OF SAID METHOD

CROSS-REFERENCE TO RELATED APPLICATIONS

This application claims priority to German Patent Application No. DE 10 2014 007 127.8, filed on May 16, 2014, and International Patent Application No. PCT/EP2015/000980, filed on May 13, 2015, both of which are hereby incorporated by reference in their entirety.

BACKGROUND

The present invention relates to a method for producing a piston for an internal combustion engine having at least two piston components, wherein at least two piston components are connected to one another along their corresponding joining surfaces via at least one radially or axially circumferential laser weld seam. The present invention furthermore relates to a piston producible by such a method.

Piston components are being joined more and more frequently by means of a laser welding method, and therefore this technique is becoming increasingly important. Axially or radially circumferential laser weld seams give rise to the problem that, in the region in which the start and the end of the circumferential laser weld seam overlap, the laser weld seam is not welded through, but rather has a reduced weld seam depth. This is because the power density or the energy input per unit length initially has to be increased continuously at the start of the laser welding operation (what is termed ramping up) and has to be reduced continuously toward the end of the laser welding operation (what is termed ramping down). During the ramping up and the ramping down, the laser weld seam is not welded through on account of the power density or energy input per unit length being too low then. As a consequence, microstructural defects, for example cracks, can arise upon cooling of the laser weld seam in the region of the latter which has not undergone through-welding.

SUMMARY

It is an object of the present invention to further develop a method of the generic type for producing a piston in such a way that the formation of microstructural defects in the region of the laser weld seam which has not undergone through-welding is effectively counteracted or microstructural defects which have already formed are eliminated.

The solution consists in a method comprising the following steps: a) aligning the at least two piston components along their corresponding joining surfaces, b) activating a laser designed for a deep-welding method and aligning the laser beam generated by the laser with a defined starting point in the region of the joining surfaces, c) increasing the power density (ramping up) of the laser beam proceeding from the defined starting point (SP) over a defined path (S1) along the corresponding joining surfaces to produce a ramp-up weld seam with an increasing weld seam depth, d) circumferential, full through-welding along the corresponding joining surfaces by means of deep welding to produce a deep weld seam with a substantially constant weld seam depth at least up to a defined end point (EP), e) reducing the power density (ramping down) of the laser beam over a defined path (S2) to produce a ramp-down weld seam with a decreasing weld seam depth, f) overwelding at least part of the defined paths (S1, S2) by means of heat conduction welding using a laser designed for a heat conduction welding method to produce at least one heat conduction weld seam.

The present invention furthermore relates to a piston for an internal combustion engine, which is producible by the method according to the invention and therefore as a result has a laser weld seam composed of a deep weld seam and a heat conduction weld seam.

For the purposes of the disclosure of the present patent application, the terms "heat conduction welding" and "deep welding" are understood as follows:

In the case of heat conduction welding, the materials of the components which are to be joined melt in the region of the joining surfaces exclusively through heat conduction, i.e. through absorption of the energy of the laser beam exclusively in the region of the component surfaces. The molten material from the two components connects the components to one another after it has solidified. The seam width is generally greater than the seam depth. The energy density of the laser beam which is required for this purpose is typically $1\times10^4$ W/cm$^2$ to $1\times10^5$ W/cm$^2$.

In the case of deep welding, the material of the components is heated to such an extent along the joining surfaces that the temperature in this region exceeds the evaporation temperature of the materials. A vapor capillary which is surrounded by molten material and moves with the laser beam is thereby produced along the joining surfaces. The material solidifying on the rear side of the vapor capillary produces a narrow deep weld seam, the weld seam depth of which is considerably greater than the weld seam width. The energy density of the laser beam which is required for this purpose is generally more than $1\times10^6$ W/cm$^2$.

The inventive concept on which the method according to the invention is based consists in the fact that a deep-welding method and a heat conduction welding method are combined with one another, in such a manner that microstructural defects arising in the region of the defined paths (S1, S2) are avoided by a locally delimited heat conduction welding method and/or are eliminated by the renewed melting of the material. This also avoids an increase in the size of already existing microstructural defects, proceeding from the microstructural defects which form during the cooling of the laser weld seam. This effect is based on the greater weld seam width of the heat conduction weld seam and therefore on reduced thermal loading and also a more uniform formation of the microstructure during the solidification of the material. In particular, microstructural defects in the form of outwardly open cracks can no longer form when finishing the surface of the piston in the region of the laser weld seam.

A further advantage of the method according to the invention consists in the fact that it can be integrated particularly easily in an existing process for producing the piston. Process stations existing upstream of the laser welding process, such as pre-machining, orientation, possibly preheating of the components to be joined, and process stations existing downstream of the laser welding process, such as subsequent heat treatment and finishing, can be retained unchanged.

Advantageous developments become apparent from the dependent claims.

In step c), the length of the defined path is preferably set, depending on the dimensions of the piston, to 5 mm to 15 mm. In a comparable manner, in step e) the length of the defined path is preferably set to 5 mm to 25 mm.

In step d), the weld seam depth of the deep weld seam is preferably set to 2 mm to 12 mm. It is particularly preferable that the deep weld seam is welded through completely.

A particularly preferred embodiment of the method according to the invention provides that the time interval between step e) and step f) is at most 10 seconds, in order to particularly effectively suppress the formation of microstructural defects during cooling. To shorten the time interval, it is possible in particular for two separate lasers to be used in step e) and in step f), wherein in step f) the heat conduction welding process is started using a separate laser before the end of step e).

In step f), the defined path (S2) is preferably overwelded completely, in order to particularly effectively prevent the continued formation of microstructural defects. If appropriate, the laser weld seam can also be overwelded partially or completely.

The at least one heat conduction weld seam is preferably oriented longitudinally with respect to the deep weld seam, in order to achieve a microstructure formation which is as uniform as possible during the solidification of the molten material. Welding transverse and/or parallel to the deep weld seam can also be effected, however, for example in the form of wave-like or zigzag-like weld seams. The weld seam depth of the heat conduction weld seam is preferably between 1 mm and 3 mm.

The method according to the invention is particularly suitable for joining a first piston component in the form of a piston main body and a second piston component in the form of an annular component, for example a depression edge element or an annular groove element.

BRIEF DESCRIPTION OF THE DRAWINGS

An exemplary embodiment of the invention will be explained in more detail hereinbelow with reference to the accompanying drawings. In a schematic illustration which is not true to scale.

DETAILED DESCRIPTION

Figure 1:
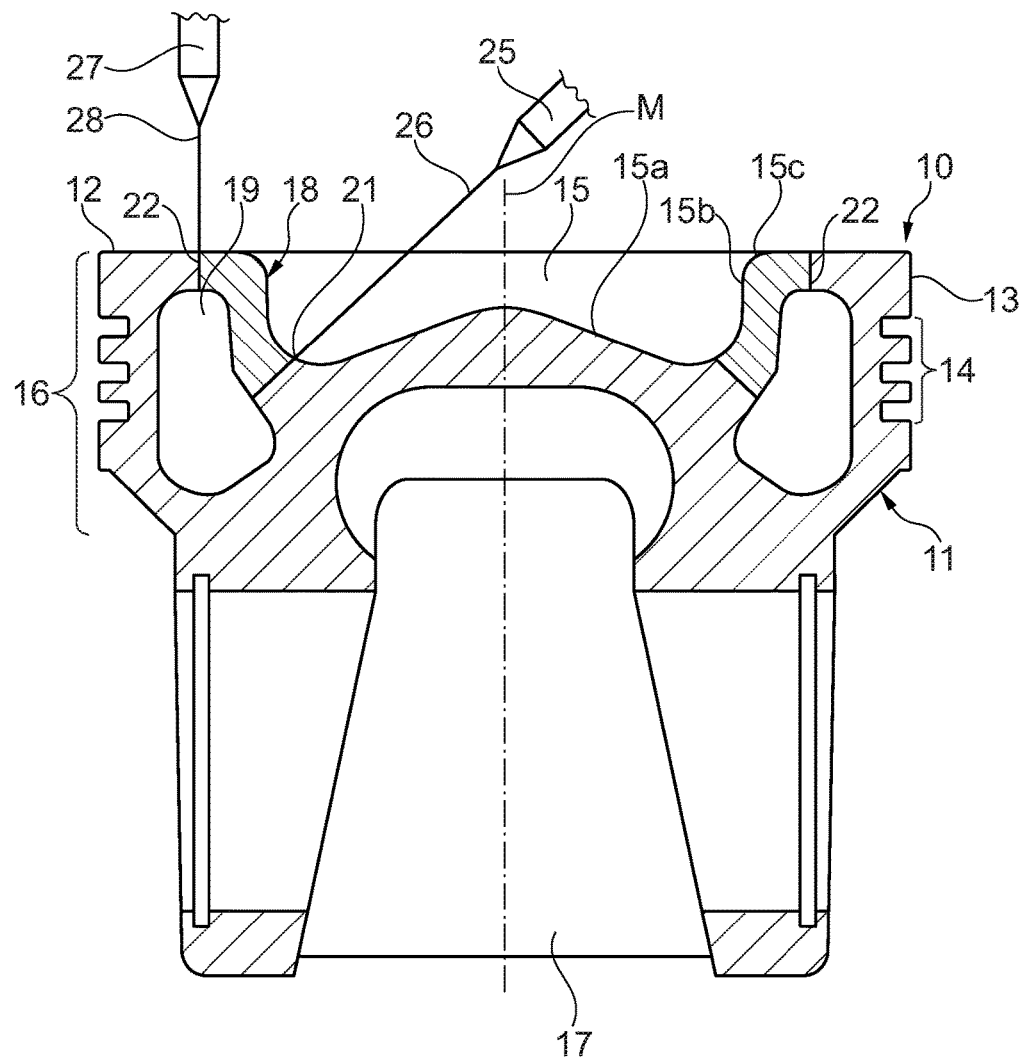
FIG. 1 shows, in section, a first exemplary embodiment of a piston produced by the method according to the invention.
Figure 2:
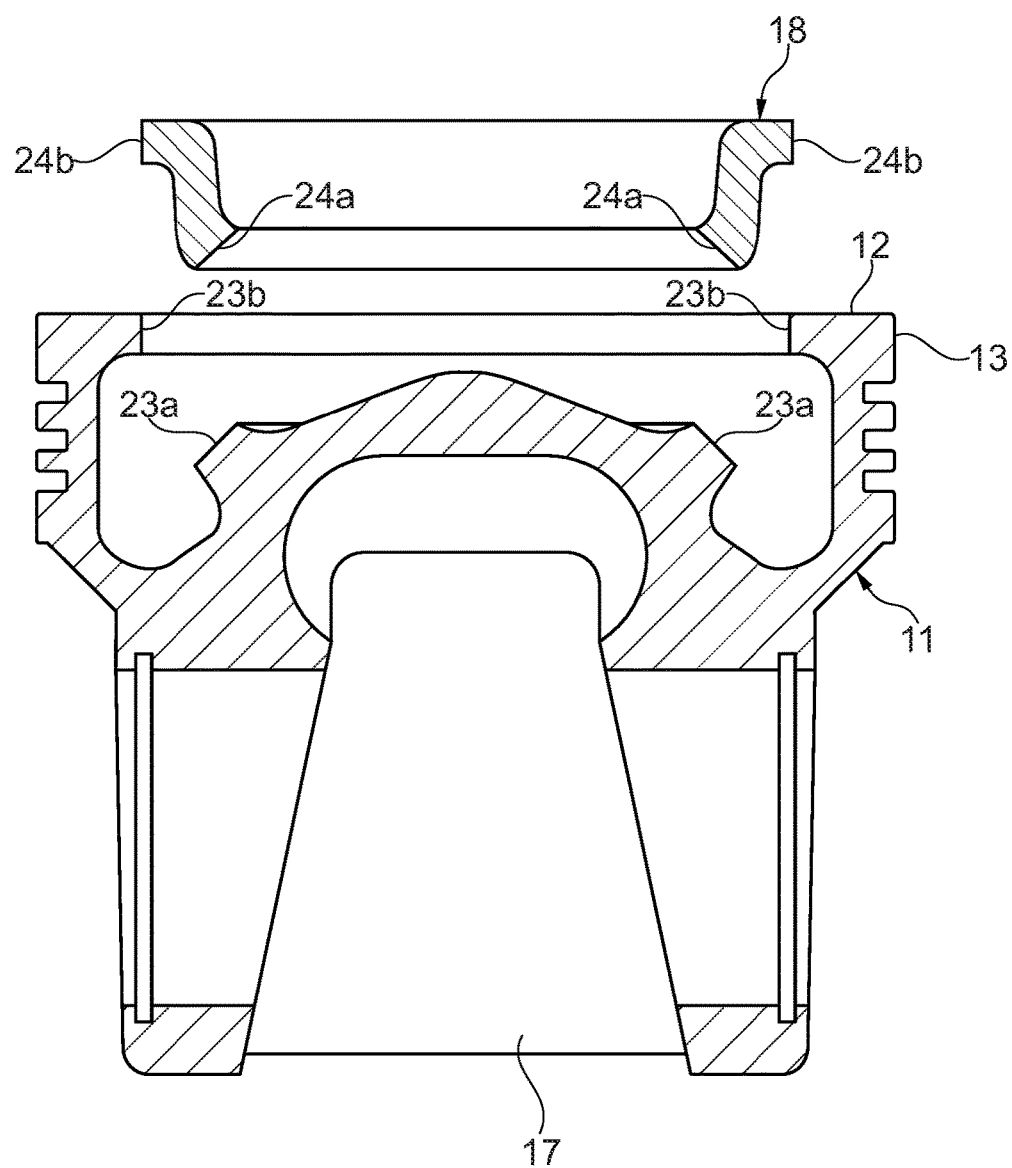
FIG. 2 shows, in section, the piston components of the piston as shown in FIG. 1 before the method according to the invention is carried out.
Figure 3:
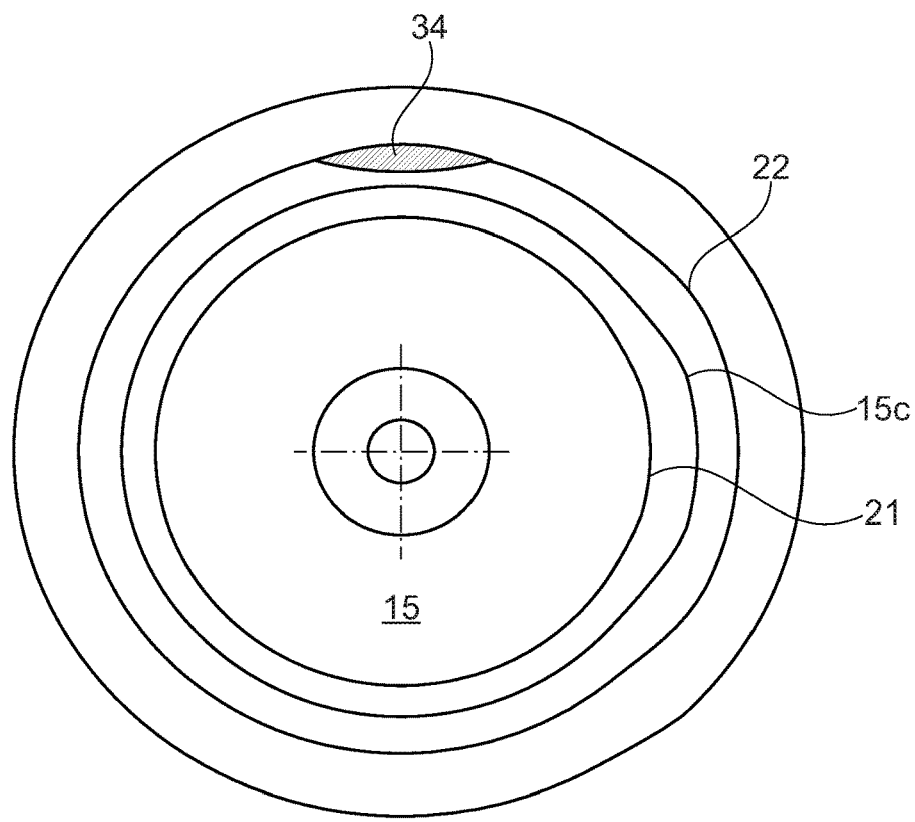
FIG. 3 shows a plan view of the piston as shown in FIG. 1.

FIGS. 1 to 3 show a first exemplary embodiment of a piston 10, both with its two individual piston components 11, 18 in the exemplary embodiment before being connected by the method according to the invention (FIG. 2) and after the connection of the piston components 11, 18 (FIGS. 1 and 3). In the exemplary embodiment, the piston 10 has a first piston component 11, which is in the form of a piston main body and is produced, for example, from a heat-treated steel such as for example 42CrMo4 or an AFP steel such as for example 38MnVS6. The first piston component 11 has an outer part of a piston crown 12, a circumferential top land 13 and also a circumferential ring section 14 with annular grooves for receiving piston rings (not shown). The first piston component 11 furthermore has the base 15a of a combustion depression 15. The first piston component 11 therefore forms a significant part of the piston head 16 of the piston 10. In a manner known per se, the first piston component 11 furthermore forms the piston skirt 17 of the piston 10.

The piston 10 furthermore has an annular second piston component 18 in the form of a depression edge element. In the exemplary embodiment, the second piston component 18 comprises the entire depression wall 15b and also the depression edge region 15c of the combustion depression 15 and furthermore an inner part of the piston crown 12. The second piston component 18 preferably consists of a particularly resistant material. A heat-treated steel or AFP steel identical or similar to that for the piston main body 11 can be used for this purpose.

The first piston component 11 and the second piston component 18 form a circumferential outer cooling channel 19. The cooling channel 19 runs firstly level with the ring section 14 and secondly level with the depression wall 15b of the combustion depression 15.

The second piston component 18 has a lower circumferential joining surface 24a (cf. FIG. 2), which forms a lower laser weld seam 21 together with a circumferential joining surface 23a, surrounding the base 15a of the combustion depression 15, (cf. FIG. 3) of the first piston component 11. In the exemplary embodiment, the lower laser weld seam 21 runs radially outward and downward proceeding from the depression wall 15b in the direction of the piston skirt 17, and opens out into the cooling channel 19.

The second piston component 18 furthermore has an upper circumferential joining surface 24b (cf. FIG. 2), which forms an upper laser weld seam 22 together with a joining surface 23b, circumferential in the region of the top land 13, (cf. FIG. 2) of the first piston component 11. In the exemplary embodiment, the upper laser weld seam 22 runs, proceeding from the piston crown 12, in a vertical direction parallel to the piston central axis M, and opens out into the cooling channel 19.

The lower laser weld seam 21 and the upper laser weld seam 22 are produced by means of a laser welding method and are arranged in such a way that they are accessible to a laser 25, 27, or the laser beams 26, 28 generated by the latter.

Figure 4:
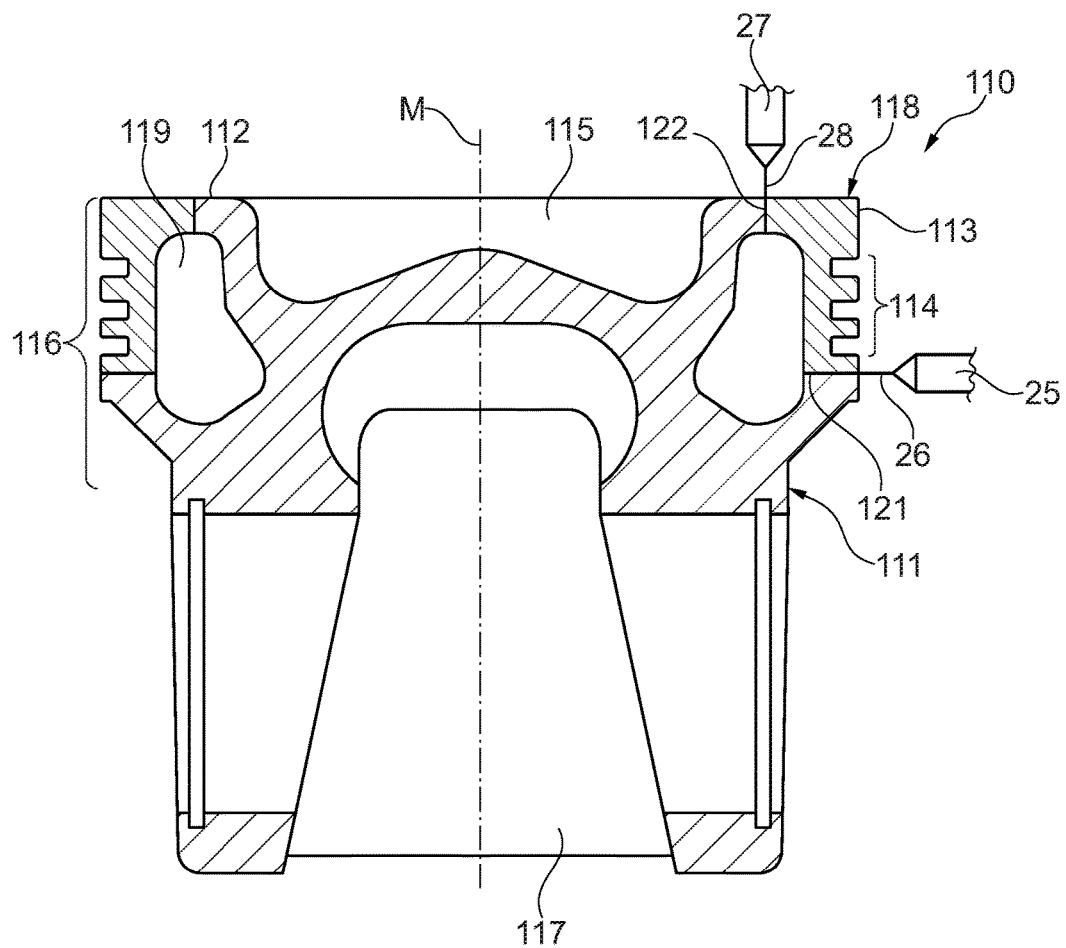
FIG. 4 shows, in section, a further exemplary embodiment of a piston according to the invention.

FIG. 4 shows a further exemplary embodiment of a piston 110, after the piston components 111, 118 thereof have been connected. In this exemplary embodiment, the piston 110 has a first piston component 111, which is in the form of a piston main body and can likewise be produced from a heat-treated steel such as for example 42CrMo4 or an AFP steel such as for example 38MnVS6. The first piston component 111 has an inner part of a piston crown 112 with a combustion depression 115. The first piston component 111 therefore forms a significant part of the piston head 116 of the piston 110. In a manner known per se, the component 111 furthermore forms the piston skirt 117 of the piston 110.

The piston 110 furthermore has an annular second piston component 118 in the form of an annular groove element. The second piston component 118 comprises the outer part of the piston crown 112, a circumferential top land 113 and also a circumferential ring section 114 with annular grooves for receiving piston rings (not shown). The second piston component 118 can likewise consist of a particularly resistant material. A heat-treated steel or AFP steel identical or similar to that for the piston main body 111 can be used for this purpose.

The first piston component 111 and the second piston component 118 form a circumferential outer cooling channel 119. The cooling channel 119 runs firstly level with the ring section 114 and secondly level with the combustion depression 115.

Analogously to the piston components 11, 18 of the piston 10, the first piston component 111 and the second piston component 118 of the piston 110 have joining surfaces (not shown), along which laser weld seams can be formed. A lower laser weld seam 121 is formed below the ring section 114 of the piston 110. In the exemplary embodiment, the lower laser weld seam 121 runs horizontally inward in a radial direction proceeding from the ring section 114, and opens out into the cooling channel 119.

An upper laser weld seam 122 is formed in the piston crown 112 of the piston 110. In the exemplary embodiment, the upper laser weld seam 122 runs, proceeding from the piston crown 112, in a vertical direction parallel to the piston central axis M, and opens out into the cooling channel 119.

Figure 5:
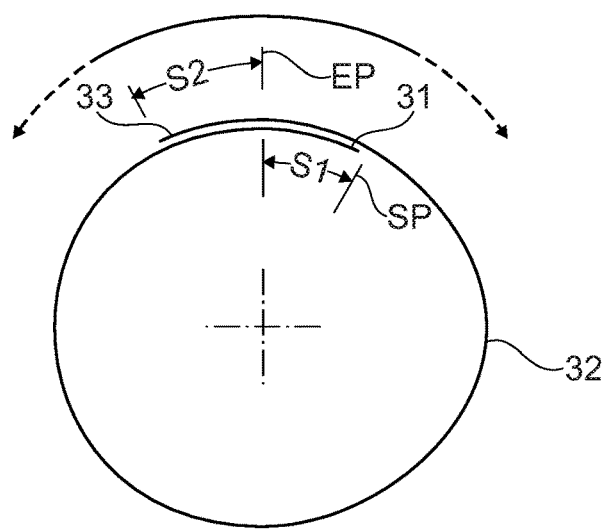
FIG. 5 shows a schematic illustration of an exemplary embodiment of the method according to the invention.

The lower laser weld seam 121 and the upper laser weld seam 122 are produced by means of a laser welding method and are arranged in such a way that they are accessible to a laser 25, 27, or the laser beams 26, 28 generated by the latter. An exemplary embodiment of the method according to the invention for producing a piston 10 or 110 will be described in more detail hereinbelow with reference to FIGS. 3 and 5.

Firstly, the first and second piston components 11, 111; 18, 118 to be connected are pre-machined. In particular, the circumferential joining surfaces 23a, 23b of the first piston component 11 and also the corresponding circumferential joining surfaces 24a, 24b of the second piston component 18 of the piston 10 or the joining surfaces of the first piston component 111 and of the second piston component 118 of the piston 110 are prepared in a manner known per se for the laser welding.

Then, the two piston components 11, 18; 111, 118 are aligned along their corresponding joining surfaces in a manner known per se. It is expedient that firstly the lower laser weld seam 21, 121 and then the upper laser weld seam 22, 122 are produced in the region of the piston crown 12, 112. To this end, use is made, for example, of a solid-state laser designed for the method parameters which are suitable for a deep-welding method. In a manner which is known per se, these method parameters depend in particular on the type of the material and the depth of the laser weld seam. Therefore, the following specifications are to be understood as meaning specifications of ranges within which the method parameters for the deep-welding method are chosen with preference.

| Laser power | 2000 W to 8000 W |
|---|---|
| Welding speed | 2 to 6 m/min, preferably 3 m/min |
| Beam diameter | 200 μm to 600 μm |

The laser beam 26 or 28 generated by the laser is aligned with a defined starting point SP (cf. FIG. 5) in the region of corresponding joining surfaces (cf. FIGS. 3 and 4). Proceeding from the starting point SP (cf. FIG. 5), the laser beam is guided along the joining surfaces. At the same time, the power density or energy input per unit length thereof is increased continuously (ramping up) over a defined path S1 to produce a ramp-up weld seam 31 with an increasing weld seam depth. The length of the defined path S1 may be, for example, 5 mm to 15 mm. When the required power density for the deep welding of at least $1 \times 10^6$ W/cm² is reached, circumferential, full through-welding is effected along the corresponding joining surfaces to produce a deep weld seam 32 with a substantially constant weld seam depth of, for example, 2 mm to 12 mm, this being dependent on the type of the material and the dimensions of the piston components. In the process, the laser beam 26, 28 is oriented parallel to the corresponding joining surfaces. The through-welding is continued until a defined end point EP is reached, with the ramp-up weld seam 31 being at least partially overwelded. Then, from the end point EP the power density of the laser beam is reduced (ramping down) over a defined path S2 to produce a ramp-down weld seam 33 with a decreasing weld seam depth. The end point EP preferably lies downstream of the ramp-up weld seam 31, and therefore the latter is overwelded completely and the ramping-down begins in the region of the deep weld seam 32. The length of the defined path S2 may be, for example, 5 mm to 25 mm, preferably up to 20 mm. The length of the path S2 is preferably twice the length of the path S1.

The following method step of overwelding should as far as possible be carried out immediately after the end of the ramping-down. The overwelding can also already be started before the end of the ramping-down, such that the laser used for that purpose runs after the laser designed for the deep welding.

In the method step of overwelding, at least part of the defined paths S1, S2 is overwelded by means of heat conduction welding with a power density of the laser beam of $1 \times 10^4$ W/cm² to $1 \times 10^5$ W/cm² using a laser designed for a heat conduction welding method to produce at least one heat conduction weld seam 34 (FIG. 3) with a weld depth of preferably at least 1 mm and at most 3 mm. To this end, use is made, for example, of a solid-state laser designed for the method parameters which are suitable for a heat conduction welding method. In a manner which is known per se, these method parameters depend in particular on the type of the material and the depth of the laser weld seam. Therefore, the following specifications are to be understood as meaning specifications of ranges within which the method parameters for the heat conduction welding method are chosen with preference.

| Laser power | 500 W to 4000 W |
|---|---|
| Welding speed | 0.5 to 3 m/min, preferably 1 m/min |
| Beam diameter | 500 μm to 3000 μm |

What is obtained as a result is a piston 10, 110 having at least one laser weld seam 21, 22; 121, 122 which is composed of a deep weld seam 32 and a heat conduction weld seam 34 (cf. FIG. 4).

In a manner known per se, the piston 10, 110 is finally finished. Depending on the materials used, this also includes a subsequent heat treatment known to a person skilled in the art.

The invention claimed is:
1. A method for producing a piston for an internal combustion engine having at least two piston components connected to one another along corresponding joining surfaces via at least one radially or axially circumferential laser weld seam, said method comprising:
aligning the at least two piston components along the corresponding joining surfaces;
activating a laser designed for deep-welding to generate a laser beam;
aligning the laser beam with a defined starting point in a region of the corresponding joining surfaces;
increasing a power density of the laser beam proceeding from the defined starting point over a first defined path along the corresponding joining surfaces to produce a ramp-up weld seam with an increasing weld seam depth;

deep welding a circumferential, full through-welding along the corresponding joining surfaces to produce a deep weld seam with a substantially constant weld seam depth up to a defined end point;

reducing the power density of the laser beam over a second defined path to produce a ramp-down weld seam with a decreasing weld seam depth; and overwelding at least part of at least one of the first and second defined paths by a laser designed for heat conduction welding to produce at least one heat conduction weld seam.

2. The method as claimed in claim 1, wherein a length of the first defined path is set to 5 mm to 15 mm.

3. The method as claimed in claim 1, wherein a length of the second defined path is set to 5 mm to 25 mm.

4. The method as claimed in claim 1, wherein the weld seam depth of the deep weld seam is set to 2 mm to 12 mm.

5. The method as claimed in claim 1, wherein a time interval between reducing the power density and overwelding is at most 10 seconds.

6. The method as claimed in claim 1, wherein the laser designed for deep-welding and the laser designed for heat conduction welding are two separate lasers, and overwelding with the laser designed for heat conduction welding is started before reducing the power density is completed.

7. The method as claimed in claim 1, wherein the second defined path is overwelded completely.

8. The method as claimed in claim 1, wherein the deep weld seam is overwelded at least partially.

9. The method as claimed in claim 1, wherein the weld seam depth of the ramp-down weld seam is set to at least 1 mm and at most 3 mm.

10. The method as claimed in claim 1, wherein a first piston component of the at least two piston components is a piston main body, and a second piston component of the at least two piston components is an annular component.

11. The method as claimed in claim 1, wherein one of the at least two piston components is an annular component in the form of a depression edge.

12. The method as claimed in claim 1, wherein one of the at least two piston components is an annular component in the form of an annular groove.

13. A piston for an internal combustion engine producible by a method comprising:
aligning at least two piston components of the piston along corresponding joining surfaces;
activating a laser designed for deep-welding to generate a laser beam;
aligning the laser beam with a defined starting point in a region of the corresponding joining surfaces;
increasing a power density of the laser beam proceeding from the defined starting point over a first defined path along the corresponding joining surfaces to produce a ramp-up weld seam with an increasing weld seam depth;
deep welding a circumferential, full through-welding along the corresponding joining surfaces to produce a deep weld seam with a substantially constant weld seam depth up to a defined end point;
reducing the power density of the laser beam over a second defined path to produce a ramp-down weld seam with a decreasing weld seam depth; and
overwelding at least part of at least one of the first and second defined paths by a laser designed for heat conduction welding to produce at least one heat conduction weld seam.

14. The piston as claimed in claim 13, wherein a length of the first defined path is set to 5 mm to 15 mm.

15. The piston as claimed in claim 13, wherein a length of the second defined path is set to 5 mm to 25 mm.

16. The piston as claimed in claim 13, wherein the weld seam depth of the deep weld seam is set to 2 mm to 12 mm.

17. The piston as claimed in claim 13, wherein a time interval between reducing the power density and overwelding is at most 10 seconds.

18. The piston as claimed in claim 13, wherein the laser designed for deep-welding and the laser designed for heat conduction welding are two separate, and overwelding with the laser designed for heat conduction welding is started before reducing the power density is completed.

19. The piston as claimed in claim 13, wherein the weld seam depth of the ramp-down weld seam is set to at least 1 mm and at most 3 mm.

20. A method for producing a piston for an internal combustion engine, comprising:
aligning at least two piston components of the piston along corresponding joining surfaces;
activating a laser designed for deep-welding to generate a laser beam;
aligning the laser beam with a defined starting point in a region of the corresponding joining surfaces;
increasing a power density of the laser beam proceeding from the defined starting point over a first defined path along the corresponding joining surfaces to produce a ramp-up weld seam with an increasing weld seam depth;
deep welding a circumferential, full through-welding along the corresponding joining surfaces to produce a deep weld seam with a substantially constant weld seam depth up to a defined end point;
reducing the power density of the laser beam over a second defined path to produce a ramp-down weld seam with a decreasing weld seam depth; and
overwelding at least the second defined path completely and the deep weld seam at least partially by a laser designed for heat conduction welding to produce at least one heat conduction weld seam.

* * * * *